United States Patent Office 2,729,012
Patented Jan. 3, 1956

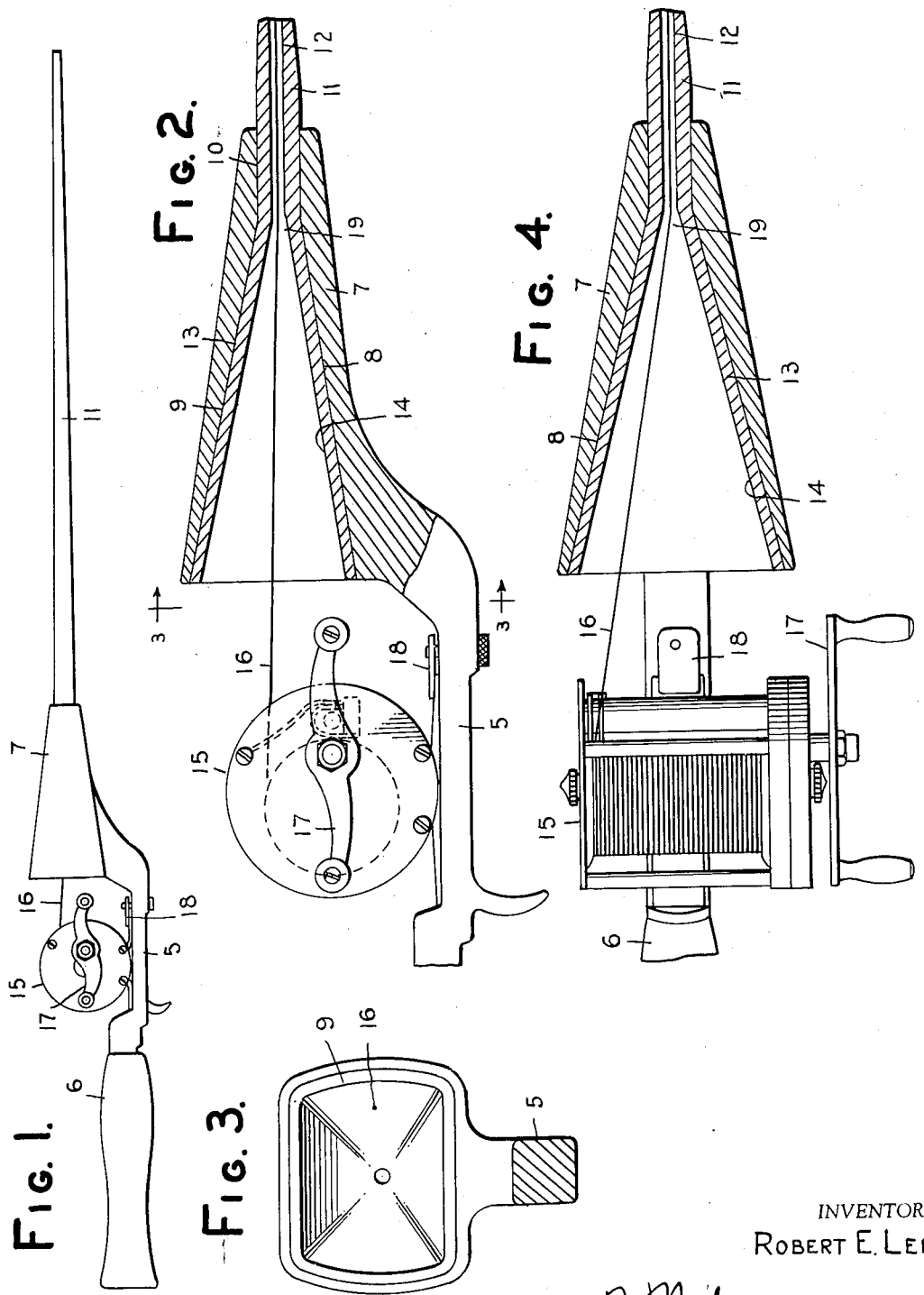

2,729,012
HAND FISHING DEVICE

Robert E. Lee, Sumter, S. C.

Application January 19, 1953, Serial No. 331,915

1 Claim. (Cl. 43—18)

My invention relates to a device to be used in hand fishing.

An important object of the invention is to provide a device of the above-mentioned character which is simple and strong and will permit of the free movement of the line without the use of separate guides, in the various methods of casting, passing a line and presenting a lure or bait.

Other objects and advantages of the invention will be apparent during the course of the following description.

In the accompanying drawings forming a part of this application and in which like numerals are employed to designate like parts throughout same, Figure 1 is a side elevation of a hand fishing device embodying my invention, Figure 2 is an enlarged side elevation of the same, parts in central vertical longitudinal section and parts broken away, Figure 3 is a transverse section taken on line 3—3 of Figure 1, and, Figure 4 is a plan view of the device, parts in central horizontal longitudinal section and parts broken away.

In the drawings where for the purpose of illustration is shown a preferred embodiment of my invention, the numeral 5 designates an approximately U-shaped body portion having a handle 6 rigidly secured to its rear end. Rigidly secured to the forward end of the U-shaped body portion 5 is an elongated tapered sleeve 7. The parts 5, 6 and 7 are preferably formed integral or they may be rigidly secured together by any suitable means. The parts 5, 6 and 7 may be formed of any suitable material such as metal, plastics or the like. The sleeve 7 has its bore 8 arranged at a slight elevation above the handle 6. The bore 8 has a rear portion 9, which is longitudinally tapered and flares rearwardly. The bore portion 9 has a greater horizontal dimension than vertical dimension. The bore 9 leads into a forward cylindrical bore portion 10, as shown.

The numeral 11 designates a tubular rod or pole which may be formed of metal or any other suitable material and this tubular rod has a cylindrical bore 12 extending through its forward end and the wall of this bore is preferably smooth or polished so that the line will freely slide therein. Formed integral with the rear end of the rod 11 is a tapered tubular extension 13, which flares rearwardly and has a bore 14, which is tapered and flares rearwardly. The reduced end of the bore 14 leads into the bore 12. The tubular extension 13 and its tapered bore 14 has a greater horizontal dimension than vertical dimension and the tapered tubular extension 13 is adapted to fit snugly within the sleeve 7, and is held therein by frictional engagement. The rod 11 is passed into the rear end of the sleeve 7 and moved forwardly through the same until the tapered tubular extension 13 fits snugly within the sleeve 7. The rod 11 and tubular extension 13 are placed in position within the sleeve 7 before the reel is secured to the body portion.

The numeral 15 designates a level wind reel of any well known or preferred construction, carrying a line 16 which is wound thereon. This level wind reel may be operated by a handle 17 and the reel is of conventional construction. Conventional means are employed to detachably mount the reel 15 upon the body portion 5 including a clamp 18.

When the parts are assembled, the line is passed through the tapered tubular extension 13 and the tubular rod. The horizontal dimension and taper of the bore 14 is such that the line may travel to both ends of the reel freely and without being opposed by the tubular extension. The vertical dimension and taper of the tubular bore 14 is such that the tubular extension 13 will leave the line free and will not interfere with the passage of the line to the reel when the line is completely wound upon the reel. The line passes through the tubular rod and extends beyond the forward end of the tubular rod, and the bore of the tubular rod constitutes the sole guide for the line, thereby eliminating the necessity of any external guide or guides. The horizontal dimension of the tapered bore 14, at its rear large end, is greater than its vertical dimension, and the tubular extension 13 cannot turn within the sleeve 7.

It is to be understood that the form of my invention herewith shown and described is to be taken as a preferred example of the same and that various changes in the shape, size and arrangement of parts may be resorted to, without departing from the spirit of my invention or the scope of the subjoined claim.

Having thus described my invention, I claim:

A hand fishing device comprising a generally U-shaped body portion including forward and rear end portions and bottom, the forward end portion extending above the rear end portion, a handle secured to the rear end portion, a sleeve secured to the forward end portion and positioned higher than said handle and extending longitudinally of the body portion and forwardly beyond the forward end portion terminating substantially at the rear face of said forward end portion, said sleeve having a bore extending longitudinally therethrough which tapers toward the forward end of the sleeve, said bore being arranged with its axis above said handle, an elongated tubular rod having a flared rear end portion which tapers forwardly, said flared rear end portion having a fitting engagement within the tapered sleeve when the flared rear end portion is inserted into the rear end of said sleeve and moved forwardly in said sleeve, the bores of said sleeve and said flared rear end portions at their rear ends having greater horizontal dimensions than vertical dimensions, a reel extending transversely of the bottom of said U-shaped body portion and detachably mounted upon said bottom so that the reel may be removed for the insertion of the flared rear end portion in the said sleeve since the flared rear end portion will then pass over said handle, said reel having an uninterrupted winding surface extending from one end of the reel to the opopsite end of the reel, the large rear end of the bore of the flared rear end portion extending at its opposite sides beyond the opposite ends of the uninterrupted winding surface of the reel, the arrangement being such that a single line when traversing the uninterrupted winding surface of the reel from one end of the winding surface to the opposite end remains out of contact with the sides of the tapered bore of the flared rear end portion.

References Cited in the file of this patent

UNITED STATES PATENTS

| 2,226,897 | Cole | Dec. 31, 1940 |
| 2,276,524 | Taylor | Mar. 17, 1942 |
| 2,334,646 | Price | Nov. 16, 1943 |
| 2,402,882 | Garr | June 25, 1946 |

FOREIGN PATENTS

| 254,172 | Switzerland | Dec. 1, 1948 |